M. METCALF.
Foundation for Honey-Combs.

No. 207,057.    Patented Aug. 13, 1878.

UNITED STATES PATENT OFFICE.

MARTIN METCALF, OF BATTLE CREEK, MICHIGAN.

IMPROVEMENT IN FOUNDATIONS FOR HONEY-COMBS.

Specification forming part of Letters Patent No. 207,057, dated August 13, 1878; application filed October 20, 1877.

*To all whom it may concern:*

Be it known that I, MARTIN METCALF, of Battle Creek, in the county of Calhoun, and in the State of Michigan, have invented certain new and useful Improvements in Foundations for Honey-Combs; and I do hereby declare that the following is a full, clear, and exact description thereof, reference being had to the accompanying drawings, and to the letters of reference marked thereon, making a part of this specification.

The object of this invention is twofold, namely: first, to furnish bee-hives with materials for the foundations of honey-combs that shall be acceptable to the bees and susceptible of readily receiving and retaining artificial indentations similar in form to those made by the bees when constructing the base or central walls of their natural combs; second, to provide a comb-foundation that, while it attains the ends above stated, shall also secure the greatest degree of perfection and permanence in the completed combs in these particulars, viz: it shall not be liable to sag, stretch, or melt at degrees of temperature to which bee-combs are ordinarily exposed, in this way to alter the size and shape of the cells, and causing warped and worthless combs, nor to become easily broken in transhipment or such handling of the combs and frames as the bee-master may have recourse to in the multitudinous manipulations thereof pertaining to the management of the modern apiary, such as swarming the bees artificially and extracting the honey.

In order to enable others skilled in the art to which my invention appertains to make and use the same, I will now proceed to describe its construction and operation, referring to the annexed drawing, in which—

Figure 1:
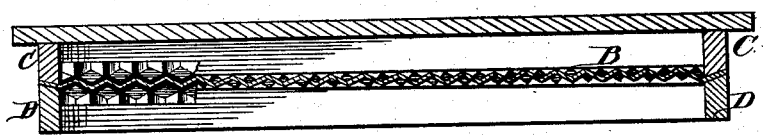
Figure 2:
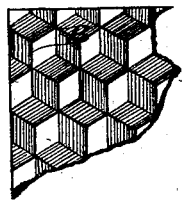

Figure 1 is a central section of a comb-frame embodying my invention. Fig. 2 is a detailed view thereof.

C represents an ordinary comb-frame, having the comb-foundation B secured therein in such a manner that no ordinary force or usage shall or can detach it.

The foundation B is made of cloth, and to render this cloth compressible into proper shape, and at the same time sufficiently inflexible to retain the impressions, it is saturated with starch and then stamped into the form of the bases of the natural hexagonal bee-cells of the honey-comb. The whole is then coated with wax; or the cloth may be prepared with a mixture of starch and wax, or other non-elastic substance suitable for the purpose and capable of receiving and permanently retaining the indentations.

The ordinary wax foundation now used frequently softens with heat, and will sag by reason thereof, and its own weight, added to that of the adhering bees, causing an elongation of the indentations and consequent enlargement of the completed bee-cells. Such enlarged cells are totally unfit for the cradles of worker-bees, and the queen will but seldom deposit her eggs in them, and when she does drones only hatch therefrom, it being well known that only drone-bees will ever mature in cells larger in any degree than those the bees provide for the rearing of worker-bees. Hence such fostering of drone-breeding, even when that rarely occurs, is none the less fatal than no increase of bees at all, and the end of a colony provided with such combs is not far away. Therefore such wax foundations are going out of use, except in the surplus honey-chambers of the hive.

Like natural honey-combs, those constructed on artificial foundations of wax only are liable to become warped by the warmth of the hive and weight of the bees and honey, and to break down, and thus become quite troublesome or entirely useless in the management of the apiary at this day, when it is deemed absolutely necessary that every comb in the hive shall be quickly removable from place to place and from one hive to another. Especially are the combs liable to such accidents in transhipments, and losses are frequent from these causes, to which must be added the all-important fact that in the use of the honey-extractor the necessity is imperative that the combs shall not be liable to injury by the rapid centrifugal force and high temperature requisite to its most expeditious and successful use.

My invention surmounts all of the obstacles enumerated, and overcomes every objection and difficulty in the way of a successful use of artificial honey-combs, both in the hive and out of it.

Having thus fully described my invention, what I claim as new, and desire to secure by Letters Patent, is—

A comb-foundation for bee-hives made of cloth saturated with starch, stamped with hexagonal indentations, and coated with wax, substantially as and for the purposes herein set forth.

In testimony that I claim the foregoing I have hereunto set my hand this 25th day of September, 1877.

MARTIN METCALF.

Witnesses:
 FOSTER M. METCALF,
 ALBERT B. METCALF.